United States Patent
Roth et al.

(10) Patent No.: US 12,351,394 B2
(45) Date of Patent: Jul. 8, 2025

(54) SYSTEMS AND METHODS FOR ASSEMBLING MERCHANDISE ORDERED BY CUSTOMERS AND SUBJECT TO MULTIPLE RETRIEVAL SYSTEMS

(71) Applicant: Walmart Apollo, LLC, Bentonville, AR (US)

(72) Inventors: Brian C. Roth, Bentonville, AR (US); Paul E. Durkee, Centerton, AR (US)

(73) Assignee: WALMART APOLLO, LLC, Bentonville, AR (US)

( * ) Notice: Subject to any disclaimer, the term of this patent is extended or adjusted under 35 U.S.C. 154(b) by 784 days.

(21) Appl. No.: 17/618,044

(22) PCT Filed: Jun. 18, 2020

(86) PCT No.: PCT/US2020/038334
§ 371 (c)(1),
(2) Date: Dec. 10, 2021

(87) PCT Pub. No.: WO2020/257389
PCT Pub. Date: Dec. 24, 2020

(65) Prior Publication Data
US 2022/0306387 A1 Sep. 29, 2022

Related U.S. Application Data

(60) Provisional application No. 62/863,989, filed on Jun. 20, 2019, provisional application No. 62/864,009, filed on Jun. 20, 2019.

(51) Int. Cl.
*B65G 1/137* (2006.01)
*G06Q 10/087* (2023.01)

(52) U.S. Cl.
CPC ......... *B65G 1/1378* (2013.01); *G06Q 10/087* (2013.01); *B65G 2201/0258* (2013.01); *B65G 2209/10* (2013.01)

(58) Field of Classification Search
CPC .......... B65G 1/1378; B65G 2201/0258; B65G 2209/10; G06Q 10/08; G06Q 10/087; G06Q 30/06
See application file for complete search history.

(56) References Cited

U.S. PATENT DOCUMENTS 5,363,310 A 11/1994 Haj-Ali-Ahmadi
5,395,206 A 3/1995 Cerny, Jr.
(Continued)

FOREIGN PATENT DOCUMENTS

| EP | 3235606 A1 | 10/2017 |
| WO | 2020257389 | 12/2020 |
| WO | 2022027000 | 2/2022 |

OTHER PUBLICATIONS

Oracle; "Oracle Warehouse Management Outbound Logistics"; https://docs.oracle.com/cd/E18727_01/doc.121/e13433/T211976T317987.htm#zzbegin; 2010; pp. 1-44.
(Continued)

*Primary Examiner* — Jacob S. Scott
*Assistant Examiner* — Erin Morris
(74) *Attorney, Agent, or Firm* — Fitch, Even, Tabin & Flannery LLP

(57) ABSTRACT

There are provided systems and methods for assembling merchandise ordered by customers, such as at shopping facilities. In one form, the system includes: a shopping order interface for receiving merchandise orders; a shopping facility including a merchandise pickup area and a merchandise assembly area; an automated retrieval system for transporting merchandise to the assembly area; an automated retrieval inventory database; an offline retrieval inventory database; and a merchandise database containing dimensions of merchandise. The system also includes a control circuit configured to: receive a merchandise order, determine dimensions of the items in the order, determine an arrange-
(Continued)

ment of the items in order containers, instruct retrieval of items by the automated retrieval system; instruct retrieval of a second set of items not capable of retrieval by the automated retrieval system; and instruct transfer and deposit of the items in the order containers.

22 Claims, 9 Drawing Sheets

(56) References Cited

U.S. PATENT DOCUMENTS

| | | |
|---|---|---|
| 6,289,260 B1 | 9/2001 | Bradley |
| 6,505,093 B1 | 1/2003 | Thatcher |
| 7,110,855 B2 | 9/2006 | Leishman |
| 7,809,467 B2 | 10/2010 | Schaefer |
| 8,326,679 B1 | 12/2012 | Rowe |
| 8,335,585 B2 | 12/2012 | Hansl |
| 8,559,699 B2 | 10/2013 | Boca |
| 8,682,751 B1 | 3/2014 | Antony |
| 9,008,827 B1 | 4/2015 | Dwarakanath |
| 9,050,719 B2 | 6/2015 | Valpola |
| 9,092,698 B2 | 7/2015 | Buehler |
| 9,457,474 B1 | 10/2016 | Lisso |
| 9,561,587 B2 | 2/2017 | Wellman |
| 9,604,358 B1 | 3/2017 | Brazeau |
| 9,611,097 B2 | 4/2017 | Lert |
| 9,623,558 B1 | 4/2017 | Stubbs |
| 9,987,746 B2 | 6/2018 | Bradski |
| 10,035,649 B2 | 7/2018 | Lert |
| 10,087,021 B2 | 10/2018 | Doke |
| 10,471,599 B1 | 11/2019 | Guerin |
| 2002/0067984 A1 | 6/2002 | Guenzi |
| 2008/0025833 A1 | 1/2008 | Baker |
| 2013/0234852 A1 | 9/2013 | Sena |
| 2013/0317642 A1 | 11/2013 | Asaria |
| 2015/0332213 A1 | 11/2015 | Galluzzo |
| 2016/0167228 A1 | 6/2016 | Wellman |
| 2018/0092304 A1 | 4/2018 | Moore |
| 2018/0244473 A1 | 8/2018 | Mathi |
| 2019/0041868 A1 | 2/2019 | Cantrell |
| 2019/0095854 A1 | 3/2019 | Pandya |
| 2019/0127099 A1 | 5/2019 | Langen |
| 2020/0087068 A1 | 3/2020 | Hance |
| 2020/0130189 A1 | 4/2020 | Ghanem |
| 2020/0346351 A1 | 11/2020 | Edwards |
| 2023/0348190 A1 | 11/2023 | Roth |

OTHER PUBLICATIONS

PCT; App No. PCT/US20/38334; International Search Report and Written Opinion mailed Sep. 11, 2020.

Guérin, Joris, et al. "Unsupervised robotic sorting: Towards autonomous decision making robots"; arXiv preprint arXiv:1804.04572; 2018.

Krainin, Michael, et al.; "Manipulator and Object Tracking for In Hand Model Acquisition"; Proceedings, IEEE International Conference on Robots and Automation; 2010; pp. 1817-1824.

Mahler, Jeffrey, et al.; "Learning deep policies for robot bin picking by simulating robust grasping sequences"; Conference on robot learning. 2017.

PCT; App. No. PCT/US2020/038334; International Preliminary Report on Patentability mailed Dec. 30, 2021; pp. 1-16.

Pinto, Andry Maykol, et al.; "Object recognition using laser range finder and machine learning techniques"; Robotics and Computer-Integrated Manufacturing 29.1 (2013): 12-22.

Premebida, Cristiano, et al.; "Intelligent robotic perception systems"; Applications of Mobile Robots; 2018; pp. 1-16.

SYSTEMS AND METHODS FOR ASSEMBLING MERCHANDISE ORDERED BY CUSTOMERS AND SUBJECT TO MULTIPLE RETRIEVAL SYSTEMS

CROSS-REFERENCE TO RELATED APPLICATIONS

This application is a U.S. national stage application of International Application No. PCT/US20/38334, filed Jun. 18, 2020, designating the United States, which claims the benefit of U.S. Provisional Application No. 62/863,989, filed Jun. 20, 2019, and U.S. Provisional Application No. 62/864,009, filed Jun. 20, 2019, both of which are incorporated herein in their entirety.

TECHNICAL FIELD

This invention relates generally to the assembly of ordered merchandise, and more particularly, to assembling merchandise items ordered by customers in order containers.

BACKGROUND

In the retail setting, customers are increasingly placing merchandise orders that are then assembled and made ready for presentation to the customers. In this regard, it is desirable to be able to assemble the merchandise orders efficiently using an automated retrieval system. The automated retrieval system may collect some or all of the ordered merchandise in a storage area and then transport it to an order assembly area by a transport conveyance, such as by a conveyor assembly, by an autonomous ground vehicle, or by other approaches.

Once some or all of the ordered merchandise have been transported to the order assembly area, they may then be transferred to an order container for eventual presentation the customer. This presentation may be, for example, in the form of pick up by the customer at the shopping facility (inside the shopping facility or in the parking lot) or in the form of delivery to the customer. However, not all merchandise in the order may be capable of retrieval by the automated retrieval system. Some of the merchandise in the order may not be part of the automated retrieval system and may require separate retrieval, such as from other locations in the shopping facility or even from other locations outside the shopping facility. Accordingly, there is a need for efficient planning and arrangement of the items that are subject to multiple retrieval systems in the order containers to be presented to the customer. Further, there is a need for the efficient handling of large or oversize items to avoid the unnecessary transfer of such items between multiple containers.

BRIEF DESCRIPTION OF THE DRAWINGS

Disclosed herein are embodiments of systems, apparatuses and methods for the arrangement and assembly of merchandise ordered by customers. This description includes drawings, wherein.

Figure 1:
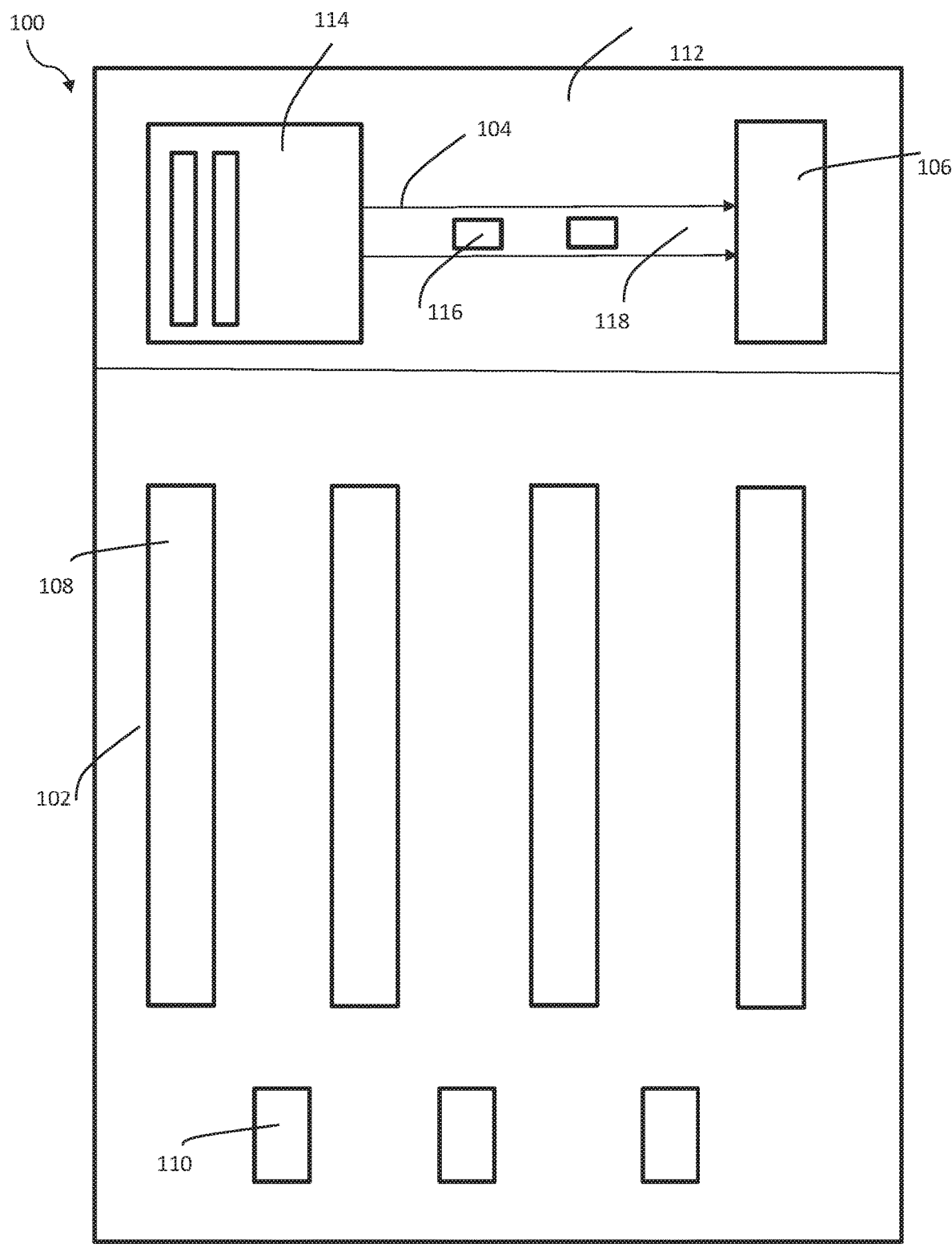
FIG. 1 is a schematic diagram in accordance with some embodiments.

Elements in the figures are illustrated for simplicity and clarity and have not necessarily been drawn to scale. For example, the dimensions and/or relative positioning of some of the elements in the figures may be exaggerated relative to other elements to help to improve understanding of various embodiments of the present invention. Also, common but well-understood elements that are useful or necessary in a commercially feasible embodiment are often not depicted in order to facilitate a less obstructed view of these various embodiments of the present invention. Certain actions and/or steps may be described or depicted in a particular order of occurrence while those skilled in the art will understand that such specificity with respect to sequence is not actually required. The terms and expressions used herein have the ordinary technical meaning as is accorded to such terms and expressions by persons skilled in the technical field as set forth above except where different specific meanings have otherwise been set forth herein.

DETAILED DESCRIPTION

Generally speaking, pursuant to various embodiments, systems, apparatuses and methods are provided herein for assembling merchandise ordered by customers and subject to multiple types of retrieval. In one form, the system comprises: a shopping order interface configured to receive a merchandise order placed by a customer and including a plurality of merchandise items; a shopping facility comprising a merchandise pickup area configured for pickup of the merchandise order and a merchandise assembly area; an automated retrieval system configured to retrieve and transport merchandise to the merchandise assembly area; an automated retrieval inventory database containing a plurality of records of merchandise at the shopping facility that is capable of retrieval by the automated retrieval system; an offline retrieval inventory database containing a plurality of records of merchandise at the shopping facility not capable of retrieval by the automated retrieval system; and a merchandise database containing a plurality of records of dimensions of merchandise. The system also comprises a control circuit communicatively coupled to the shopping order interface, the automated retrieval inventory database, the offline inventory database, and the merchandise database, the control circuit configured to: receive the merchandise order from the shopping order interface; determine dimensions of the merchandise items in the merchandise order; determine an arrangement of the merchandise items in a plurality of order containers for the customer; instruct retrieval of a first set of the merchandise items in the merchandise order that are in the automated retrieval inventory database and capable of retrieval by the automated retrieval system; instruct transfer and deposit of the first set of the merchandise items in the order containers; instruct retrieval of a second set of the merchandise items in the merchandise order that are in the offline retrieval inventory database and not capable of retrieval by the automated retrieval system; and instruct transfer and deposit of the second set of the merchandise items in the order containers.

In some implementations, in the system, the shopping facility further comprises a merchandise storage area configured to store merchandise; and the automated retrieval system further comprises: a plurality of storage containers configured to contain merchandise in the merchandise storage area; and a transport conveyance configured to transport storage containers between the merchandise storage area and the merchandise assembly area. In some implementations, the transport conveyance comprises at least one of a conveyor assembly, a robotic arm, a robotic vehicle, or a robotic bot. In some implementations, the robotic vehicle is an autonomous ground vehicle (AGV) comprising: a locomotion system configured to facilitate movement of the AGV between the merchandise storage area and the merchandise assembly area; at least one obstacle detection sensor configured to detect obstacles in a direction of travel of the AGV; a navigational system configured to guide movement of the AGV and avoid obstacles; a merchandise retrieval mechanism configured to retrieve the first set of merchandise items from the merchandise storage area; and an AGV control circuit operatively coupled to the locomotion system, the at least one obstacle detection sensor, the navigational system, and the merchandise retrieval mechanism, the AGV control circuit configured to operate and move the AGV and to retrieve and deliver the first set of merchandise items. In some implementations, in the system, the control circuit is configured to: determine if all of the merchandise items in the merchandise order are in the automated retrieval inventory database, and if so, allocate the first set to include all of the merchandise items in the merchandise order and allocate the second set to not include any of the merchandise items. In some implementations, the control circuit is configured to: determine completion of transfer and deposit of the merchandise items to the order containers. In some implementations, the offline retrieval inventory database contains a plurality of records of merchandise that is not available at the shopping facility but that is available at other shopping facilities; and the control circuit is configured to instruct retrieval of a subset of the second set of the merchandise items that are not available at the shopping facility but that are available at other shopping facilities. In some implementations, the control circuit is configured to instruct that transfer and deposit of the first set of the merchandise items from the automated retrieval inventory database be performed prior to transfer and deposit of the second set of the merchandise items from the offline retrieval inventory database. In some implementations, the automated retrieval inventory database, the offline retrieval inventory database, and the merchandise database are all part of a single database. In some implementations, the merchandise pickup area and the merchandise assembly area are in the same physical area of the shopping facility.

In another form, there is provided a method of assembling merchandise ordered by customers and subject to multiple types of retrieval, the method comprising: by a shopping order interface, receiving a merchandise order placed by a customer and including a plurality of merchandise items; providing a shopping facility comprising a merchandise pickup area configured for pickup of the merchandise order and a merchandise assembly area; by an automated retrieval system, retrieving and transporting merchandise to the merchandise assembly area; storing in an automated retrieval inventory database a plurality of records of merchandise at the shopping facility that is capable of retrieval by the automated retrieval system; storing in an offline retrieval inventory database a plurality of records of merchandise at the shopping facility not capable of retrieval by the automated retrieval system; and storing in a merchandise database a plurality of records of dimensions of merchandise. The method further includes, by a control circuit: receiving the merchandise order from the shopping order interface; determining dimensions of the merchandise items in the merchandise order; determining an arrangement of the merchandise items in a plurality of order containers for the customer; instructing retrieval of a first set of the merchandise items in the merchandise order that are in the automated retrieval inventory database and capable of retrieval by the automated retrieval system; instructing transfer and deposit of the first set of the merchandise items in the order containers; instructing retrieval of a second set of the merchandise items in the merchandise order that are in the offline retrieval inventory database and not capable of retrieval by the automated retrieval system; and instructing transfer and deposit of the second set of the merchandise items in the order containers.

In another form, there is provided a system for assembling different types of merchandise in containers, the system comprising: a shopping order interface configured to receive a merchandise order placed by a customer and including a plurality of merchandise items; a shopping facility comprising a merchandise assembly area configured for assembly of part or all of the merchandise order; an automated retrieval system configured to retrieve and transport a set of the merchandise items in a plurality of storage containers to the merchandise assembly area; and a merchandise database containing a plurality of records of the set of merchandise items, the plurality of records indicating the size of each merchandise item and whether each merchandise item of the set exceeds a predetermined threshold size and constitutes an oversize merchandise item. The system further includes a control circuit communicatively coupled to the shopping order interface and the merchandise database, the control circuit configured to: receive the merchandise order from the shopping order interface; instruct retrieval of the set of the merchandise items in the merchandise order that are capable of retrieval by the automated retrieval system: determine, from the merchandise database, a subset of oversize merchandise items being retrieved by the automated retrieval system, each oversize merchandise item occupying one storage container; reassign each storage container transporting an oversize merchandise item as an order container; determine an assignment of the plurality of merchandise items to a plurality of order containers for the customer; and instruct transfer of the set of merchandise items, excluding the subset of oversize items, from the plurality of storage containers to the plurality of order containers.

In some implementations, the system further includes an image sensor configured to capture images of merchandise items being transported in the plurality of storage containers to the merchandise assembly area. In some implementations, the control circuit is configured to: confirm, from the images from the image sensor, that an oversize merchandise item occupies more than a predetermined volume of a storage container transporting the oversize merchandise item to the merchandise assembly area. In some implementations, the control circuit is configured to: determine the assignment of the non-oversize merchandise items to the plurality of order containers for the customer based, at least in part, on the images from the image sensor. In some implementations, the merchandise database contains a plurality of dimensions of each merchandise item of the set of merchandise items. In some implementations, the control circuit is configured to: assign two or more non-oversize merchandise items to each order container, the number of non-oversize merchandise items assigned to each order container depending on the total size of the two or more non-oversize items relative to a volume of the order container. In some implementations, each storage container defines a first volume and each order container defines a second volume, the first and second volumes being the same. In some implementations, the automated retrieval system comprises a transport conveyance configured to transport the plurality of storage containers to the merchandise assembly area, the transport conveyance comprising at least one of a conveyor assembly and an autonomous ground vehicle (AGV). In some implementations, the AGV comprises: a locomotion system configured to facilitate movement of the AGV to the merchandise assembly area; at least one obstacle detection sensor configured to detect obstacles in a direction of travel of the AGV; a navigational system configured to guide movement of the AGV and avoid obstacles; and an AGV control circuit operatively coupled to the locomotion system, the at least one obstacle detection sensor, and the navigational system, the AGV control circuit configured to operate and move the AGV and to deliver the set of merchandise items to the merchandise assembly area.

In another form, there is provided a method for assembling different types of merchandise in containers, the method comprising: by a shopping order interface, receiving a merchandise order placed by a customer and including a plurality of merchandise items; providing a shopping facility comprising a merchandise assembly area configured for assembly of part or all of the merchandise order; by an automated retrieval system, retrieving and transporting a set of the merchandise items in a plurality of storage containers to the merchandise assembly area; and storing in a merchandise database a plurality of records of the set of merchandise items, the plurality of records indicating the size of each merchandise item and whether each merchandise item of the set exceeds a predetermined threshold size and constitutes an oversize merchandise item. The method further includes, by a control circuit: receiving the merchandise order from the shopping order interface; instructing retrieval of the set of the merchandise items in the merchandise order that are capable of retrieval by the automated retrieval system; determining, from the merchandise database, a subset of oversize merchandise items being retrieved by the automated retrieval system, each oversize merchandise item occupying one storage container; reassigning each storage container transporting an oversize merchandise item as an order container; determining an assignment of the plurality of merchandise items to a plurality of order containers for the customer; and instructing transfer of the set of merchandise items, excluding the subset of oversize items, from the plurality of storage containers to the plurality of order containers.

In another form, there is provided a system for assembling different types of merchandise in containers, the system comprising: a shopping order interface configured to receive a merchandise order placed by a customer and including a plurality of merchandise items; a shopping facility comprising a merchandise assembly area configured for assembly of part or all of the merchandise order; an automated retrieval system configured to retrieve and transport a set of the merchandise items in a plurality of storage containers to the merchandise assembly area; and an image sensor configured to capture images of merchandise items being transported in the plurality of storage containers to the merchandise assembly area. The system further includes a control circuit communicatively coupled to the shopping order interface and the image sensor, the control circuit configured to: receive the merchandise order from the shopping order interface; instruct retrieval of the set of the merchandise items in the merchandise order that are capable of retrieval by the automated retrieval system; determine, from the images from the image sensor, that a merchandise item constitutes an oversize merchandise item when it occupies more than a predetermined volume of a storage container transporting the merchandise item to the merchandise assembly area, reassign each storage container transporting an oversize merchandise item as an order container; determine an assignment of the plurality of merchandise items to a plurality of order containers for the customer; and instruct transfer of the set of merchandise items, excluding the oversize items, from the plurality of storage containers to the plurality of order containers.

This disclosure relates generally to approaches for assembling merchandise orders that have been placed by customers for presentation to the customers. For example, merchandise orders may be placed by a customer via a computing device and may include a desired time for pick up of the merchandise order at a shopping facility close to the customer's residence. It is further contemplated that some of the merchandise items may be subject to an automated storage and retrieval system (or online retrieval), while other merchandise items are not part of this system and need to be collected offline (or manually). Some or all of the merchandise may be transported to a merchandise assembly area in the shopping facility where it may then be transferred to one or more order totes or containers, which will eventually be picked up by customers at the shopping facility. In another form, the merchandise order may be assembled for delivery to the customer.

Referring to FIG. 1, there is shown part of a system 100 for assembling merchandise at a shopping facility 102. The system 100 includes a shopping facility 102 that includes a merchandise order assembly area 106 (or merchandise assembly area or assembly/work station). It is generally contemplated that the shopping facility 102 may be any of various types of facilities at which merchandise is located, such as, for example, retail stores, distribution centers storing merchandise, etc. FIG. 1 shows one example of a shopping facility 102 in the form of a retail store. This shopping facility 102 includes shelves/aisles 108 on which merchandise may be arranged and point-of-sale checkout areas 110 where purchase of merchandise may be completed (which may also serve as merchandise pickup areas for merchandise ordered by customers). Alternatively, in another form, merchandise may be assembled and held for pickup at same place in shopping facility 102. For example, the merchandise pickup area and the merchandise assembly area 106 may be in the same physical area of the shopping facility or may be in the same location. In another form, the merchandise pickup area may be in the parking lot of the facility for pick up by customers. In yet another form, the merchandise pickup area at the shopping facility 102 may allow pick up by an employee or third party for delivery to the customer, such as at to the customer's residence.

The merchandise order assembly area 106 is configured for assembly of part or all of a merchandise order, which may be picked up by customers. In one form, this merchandise order assembly area 106 may be disposed in a separate backroom area 112 of the shopping facility 102. It is generally contemplated that merchandise may be transported to the merchandise order assembly area 106 by an automated retrieval system 104 and/or offline/manually (such as by store employees). The merchandise order assembly area 106 may be of any of various sizes and arrangements so as to allow transfer of merchandise to order totes/containers for pick up customers. The merchandise order assembly area 106 may also serve as a customer pick up area at the shopping facility 102 or the customer pick up area may be at a different location (such as an in-store location or in the parking lot).

The system 100 includes an automated retrieval system 104 that is configured to retrieve and transport merchandise to the merchandise order assembly area 106. It is contemplated that the automated retrieval system 104 may transport only a portion (and not necessarily all) of the merchandise being transported to the merchandise order assembly area 106. In this particular form, some or all of the merchandise may be transported from a merchandise storage area 114 to the merchandise order assembly area 106 in the backroom area 112 of the shopping facility 102. In another form, the merchandise storage area 114 may be in the form of grid storage accessible to robotic vehicles in the backroom area 112 or at a warehouse. It is generally contemplated that the automated retrieval system 104 may include virtually all manner of storage and/or conveyance.

The automated retrieval system 104 may include a plurality of storage containers (or storage totes) 116 configured to contain merchandise in a merchandise storage area 114 in the shopping facility 102. It may further include a transport conveyance 118 configured to transport the storage containers 116 between the merchandise storage area 114 and the merchandise order assembly area 106. In one form, the transport conveyance 118 may be in the form of one or more conveyor assemblies. It is generally contemplated that the transport conveyance 118 may be made up of various types of transport devices or equipment.

In addition to conveyor assemblies, or in other forms, the transport conveyance 118 may include at least one of a robotic arm, a robotic vehicle, a robotic bot, or other robotic device (and may include various combinations of robotic devices). For example, the transport conveyance 118 may use one or more robotic arms that may have different types of end effectors to grasp merchandise arriving in storage containers 116 at the merchandise assembly area 106 and transfer them to order containers 156. In addition, the transport conveyance 118 may be in the form of robotic vehicles with access to grid storage units, or it may make use of robotic bots. These robotic vehicles and robotic bots may provide additional or alternative transport mechanisms.

Figure 2:
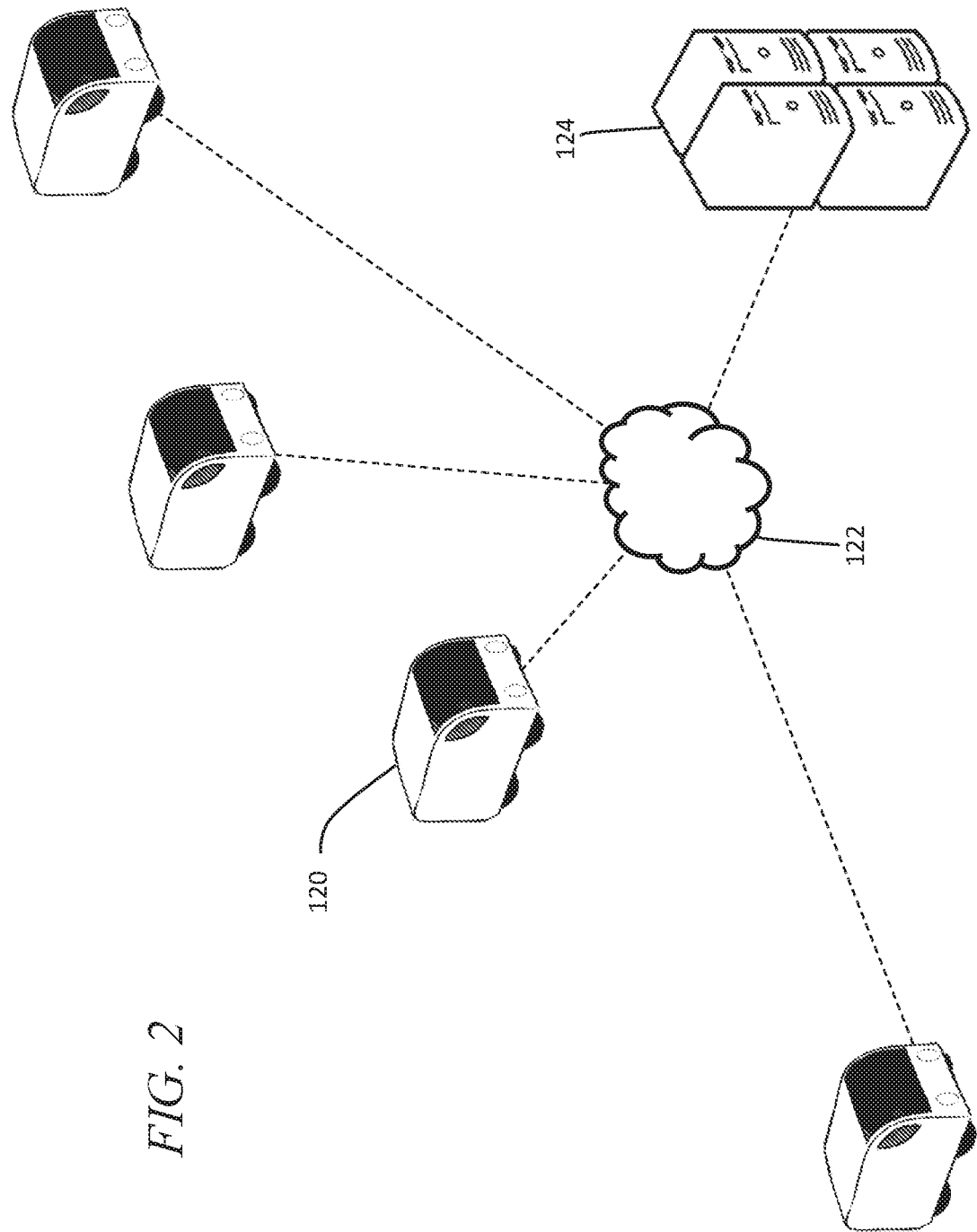
FIG. 2 is a block diagram in accordance with some embodiments.

Alternatively, or in addition to the above forms, the transport conveyance 118 may employ one or more autonomous ground vehicles 120 to transport some or all of the merchandise. Referring to FIG. 2, there is shown an example in which multiple AGVs 120 move about the shopping facility 102 and operate autonomously. It is generally contemplated that the multiple AGVs 120 may travel back and forth between the merchandise storage area 114 and the merchandise order assembly area 106 at the shopping facility 102. Under this approach, to facilitate coordination of the AGVs 120 in transporting different merchandise, the AGVs 120 may communicate over a network 122. The system 100 may include a central computer system 124 (or control circuit) at the shopping facility 102 accessible by one or more of the AGVs 120 over the network 122.

Figure 3:
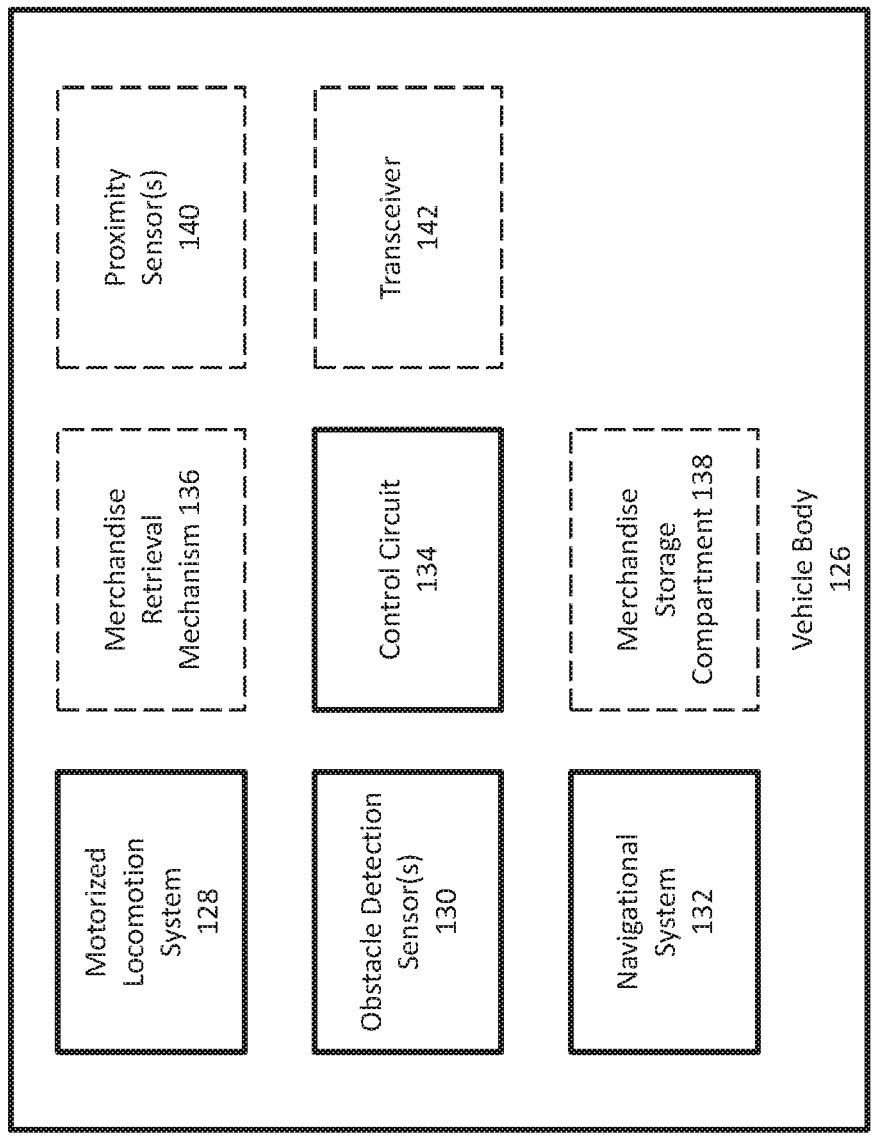
FIG. 3 is a block diagram in accordance with some embodiments.

Referring now to FIG. 3, it is generally contemplated that the AGV 120 includes certain components in and about its vehicle body 126 that allow it to convey merchandise and to travel about the shopping facility 102. In one form, each AGV 120 includes a motorized locomotion system 128, at least one obstacle detection sensor 130, a navigational system 132, and an AGV control circuit 134. It is contemplated that the AGV 120 may also include other components, such as, without limitation, a merchandise retrieval mechanism 136, a merchandise storage compartment 138, proximity sensor(s) 140, and a transceiver 142. It is generally contemplated that the AGVs 120 are generally interchangeable with one another.

In one form, this disclosure relates generally to an approach for coordinating online/automated and offline/manual systems for filling merchandise orders, including the automated retrieval system 104 that automatically transports various types of merchandise. Under this approach, there may be a planned arrangement of space in a container/tote for receiving the ordered merchandise where it is known that the merchandise is available, i.e., some of the merchandise may be in the automated retrieval system 104 and other merchandise may be at a store or other locations. For example, a customer may order milk and orange juice, and even though only the orange juice is in the automated retrieval system 104, the milk is available at the store. The approach fills the order in the container/tote for the orange juice and leaves space in the container/tote for the milk. The approach further generates a request for an employee or robot to go pick the milk from the store. The space in the container/tote is physically empty but allocated for a specific product. The space allocated is specific to the merchandise item to be picked based on the known dimensions of the item (length, width, and height of the milk jug). This approach ensures that the container (bin etc.) is not overfilled or underutilized once assembly is completed.

As addressed further below, the approach generally involves a database of dimensional information on products. This dimensional information is preferably retrieved at the initiation of the order assembly so as to determine the least number of containers (totes, bins, etc.) needed to fill the order. The approach is generally intended to optimize the space in the containers/totes occupied by merchandise. Without this approach, there is a possibility of two or more order containers (totes, bins, etc.) that are partially filled: one set from the automated retrieval system 104 and another set from other locations. These other locations may include a store housing or adjacent to the automated retrieval system 104, nearby stores, distribution centers, supplier warehouses, products in the supply chain that are en route, and expected products (products ordered but not yet received and with a known delivery date). These other locations may require additional sensors, such as RFID sensors in warehouses, trucks, and/or shelves.

Figure 4:
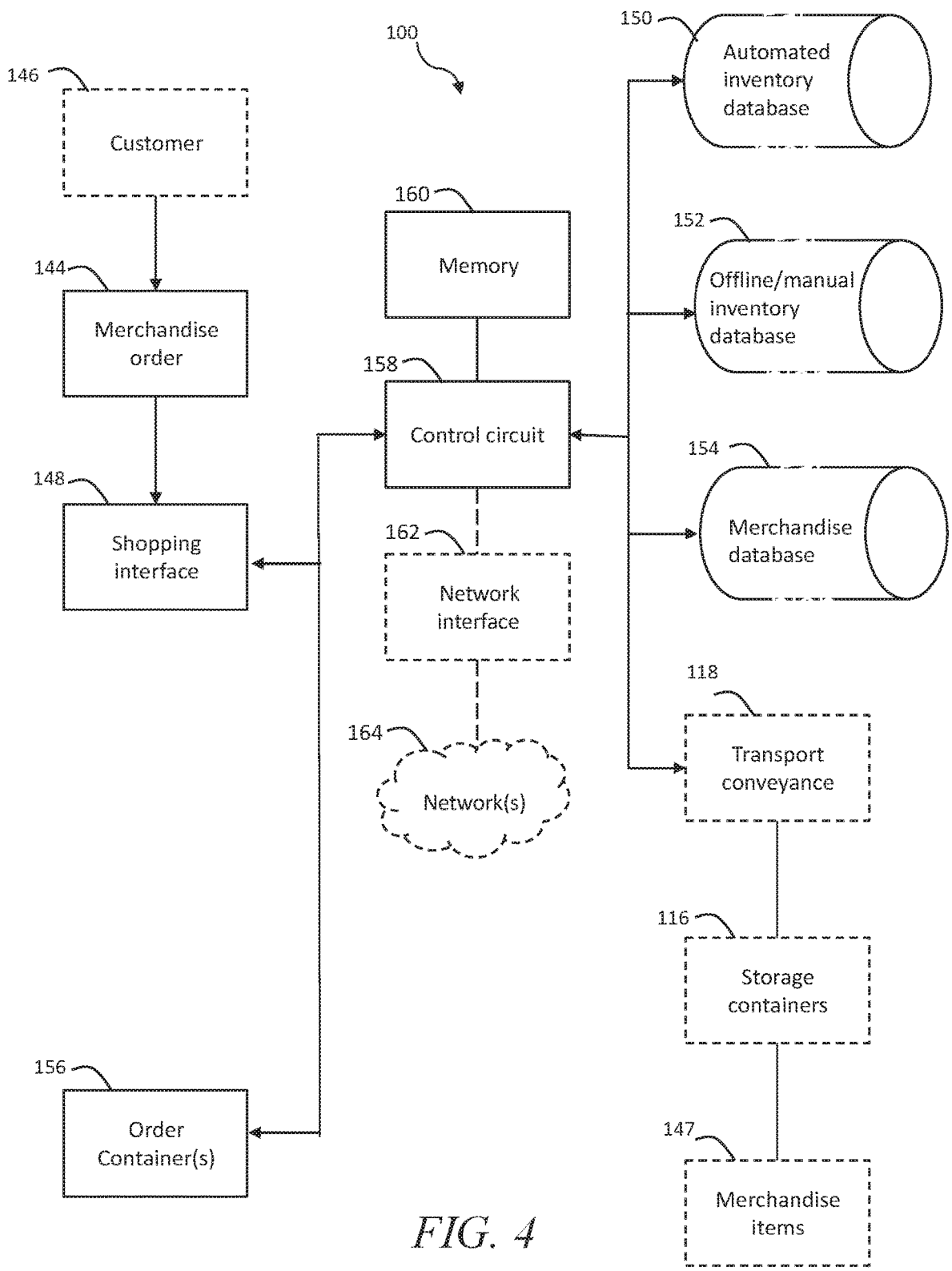
FIG. 4 is a block diagram in accordance with some embodiments.

FIG. 4 shows some of the components of the system 100 for assembling merchandise at the shopping facility 102. It is generally contemplated that merchandise orders 144 are placed by customers 146 and are to be assembled for presentation to the customers. It is generally contemplated that some of the merchandise may be retrieved by the automated retrieval system 104 while other merchandise must be retrieved by other means.

The system 100 includes a shopping order interface 148 configured to receive the merchandise order 144 placed by the customer 146 and including a plurality of merchandise items. In this context, shopping order interface 148 should be understood to refer broadly to any interface configured to receive information regarding the ordered merchandise, such as from the customer's mobile device or other computing device. For example, the shopping order interface 148 may be a server at the shopping facility 102 or may be a retailer website accessible to a customer's mobile device by a software application.

The system 100 also includes an automated retrieval inventory database 150 containing a plurality of records of merchandise at the shopping facility 102 that is capable of retrieval by the automated retrieval system 104. In one form, it is contemplated that many (but not all) merchandise items will be readily incorporated into the automated retrieval system 104. However, some merchandise items may not be incorporated into the automated retrieval system 104 due to any of various factors, such as, for example, due to shape, size, weight, fragility, temperature requirements (perishability), availability (special orders), etc. Such merchandise items may require special handling. Accordingly, such items may be stored in an offline/manual retrieval inventory database 152 containing a plurality of records of merchandise at the shopping facility 102 not capable of retrieval by the automated retrieval system 104.

The system 100 further includes a merchandise database 154 containing a plurality of records of dimensions of merchandise. It is generally contemplated that the dimensions of the merchandise will be used to coordinate arrangement of the ordered merchandise in order containers 156 to be picked up by the customer 146 ordering the merchandise. Some of the merchandise may be transported by the automated retrieval system 104, while other merchandise may be transported by other means. The system 100 includes a merchandise database 154 of dimensions to allow the efficient packing of multiple merchandise items collected in different ways in one or more order containers 156. In one form, the system 100 may use a unitary database with all the required information. In other words, the automated retrieval inventory database 150, the offline/manual retrieval inventory database 152, and the merchandise database 154 may all be part of a single database.

As shown in FIG. 4, a control circuit 158 governs the operation of the system 100. The control circuit 158 may be in wired or wireless communication with the shopping order interface 148, the automated retrieval inventory database 150, the offline/manual inventory database 152, and the merchandise database 154. As described herein, the language "control circuit" refers broadly to any microcontroller, computer, or processor-based device with processor, memory, and programmable input/output peripherals, which is generally designed to govern the operation of other components and devices. It is further understood to include common accompanying accessory devices, including memory, transceivers for communication with other components and devices, etc. These architectural options are well known and understood in the art and require no further description here. The control circuit 158 may be configured (for example, by using corresponding programming stored in a memory as will be well understood by those skilled in the art) to carry out one or more of the steps, actions, and/or functions described herein.

As shown in FIG. 4, the control circuit 158 is coupled to a memory 160 and may be coupled to a network interface 162 and network(s) 164. The memory 160 can, for example, store non-transitorily computer instructions that cause the control circuit 158 to operate as described herein, when the instructions are executed, as is well known in the art. Further, the network interface 162 may enable the control circuit 158 to communicate with other elements (both internal and external to the system 100). This network interface 162 is well understood in the art. The network interface 162 can communicatively couple the control circuit 158 to whatever network or networks 164 may be appropriate for the circumstances. The control circuit 158 may be in communication with the server of the shopping facility 102 and may make use of cloud databases and/or operate in conjunction with a cloud computing platform.

The control circuit 158 receives the merchandise order 144 from the shopping order interface 148. It determines the dimensions of the merchandise items in the merchandise order 144 (via the merchandise database 154) and determines an arrangement of the merchandise items in a plurality of order containers 156 for presentation to the customer. It is generally contemplated that the control circuit 158 calculates a packing arrangement of the merchandise items in the order containers 156 based on the dimensions of the merchandise items and the order containers 156. As should be understood, there are a number of different packing arrangements that are possible, and it is generally contemplated that the control circuit 158 will calculate an efficient packing arrangement to optimize the use of order containers 156.

The control circuit 158 instructs retrieval of a first set of the merchandise items in the merchandise order 144 that are in the automated retrieval inventory database 150 and capable of retrieval by the automated retrieval system 104. It further instructs transfer and deposit of the first set of the merchandise items in the order containers 156. The control circuit 158 instructs retrieval of a second set of the merchandise items in the merchandise order 144 that are in the manual retrieval inventory database 152 and not capable of retrieval by the automated retrieval system 104. It then instructs transfer and deposit of the second set of the merchandise items in the order containers 156.

In some circumstance, it may be that all of the merchandise items in the merchandise order 144 are subject to automated retrieval. In this circumstance, the control circuit 158 may determine if all of the merchandise items in the merchandise order 144 are in the automated retrieval inventory database 150. If so, the control circuit 158 may allocate the first set to include all of the merchandise items in the merchandise order 144 and allocate the second set to not include any of the merchandise items. In other words, in that circumstance, the control circuit 158 need not instruct retrieval, transfer, and deposit of merchandise items subject to manual retrieval (because there are none). Conversely, if all of the merchandise items in the merchandise order 144 are subject to manual retrieval, the control circuit 158 need not instruct retrieval, transfer, and deposit of merchandise items subject to automated retrieval (because there are none).

In one form, it is contemplated that the control circuit 158 may determine completion of transfer and deposit of the merchandise items to the order containers 156. This determination may be accomplished in various ways. For example, the control circuit 158 may track the last merchandise item in the merchandise order 144 for which it has instructed retrieval and/or transfer and deposit. Alternatively, the control circuit 158 may receive a signal from the merchandise assembly area 106 indicating completion, such as manually from an employee or automatically from a sensor indicating occupancy of some or all of the designated order containers 156 by the ordered merchandise. In any event, it is contemplated that, following this determination, the control circuit 158 can signal that the merchandise order 144 is ready for presentation to the customer 146.

In one form, it is contemplated that some of the merchandise may be available at other locations outside of the shopping facility 102. In this circumstance, the offline retrieval inventory database 152 may contain a plurality of records of merchandise that is not available at the shopping facility 102 but that is available at other shopping facilities. For example, these items may include items that are simply out of stock at the shopping facility 102 or may include unusual, specialty items. The control circuit 158 may instruct retrieval of a subset of the second set of the merchandise items that are not available at the shopping facility 102 but that are available at these other locations.

It should also be understood that the automated retrieval and the offline retrieval may occur simultaneously or in a desired order. For example, automated retrieval may be performed prior to offline retrieval. In other words, the control circuit 158 may instruct that transfer and deposit of the first set of the merchandise items from the automated retrieval inventory database 150 be performed prior to transfer and deposit of the second set of the merchandise items from the offline retrieval inventory database 152. It may be easier and/or more convenient to partially fill the order containers 156 by automated retrieval first with the remaining space then filled by offline retrieval. Alternatively, in some circumstances, it may be desirable to perform simultaneous retrieval (such as due to time constraints) or to instruct offline retrieval to occur first.

Figure 5:
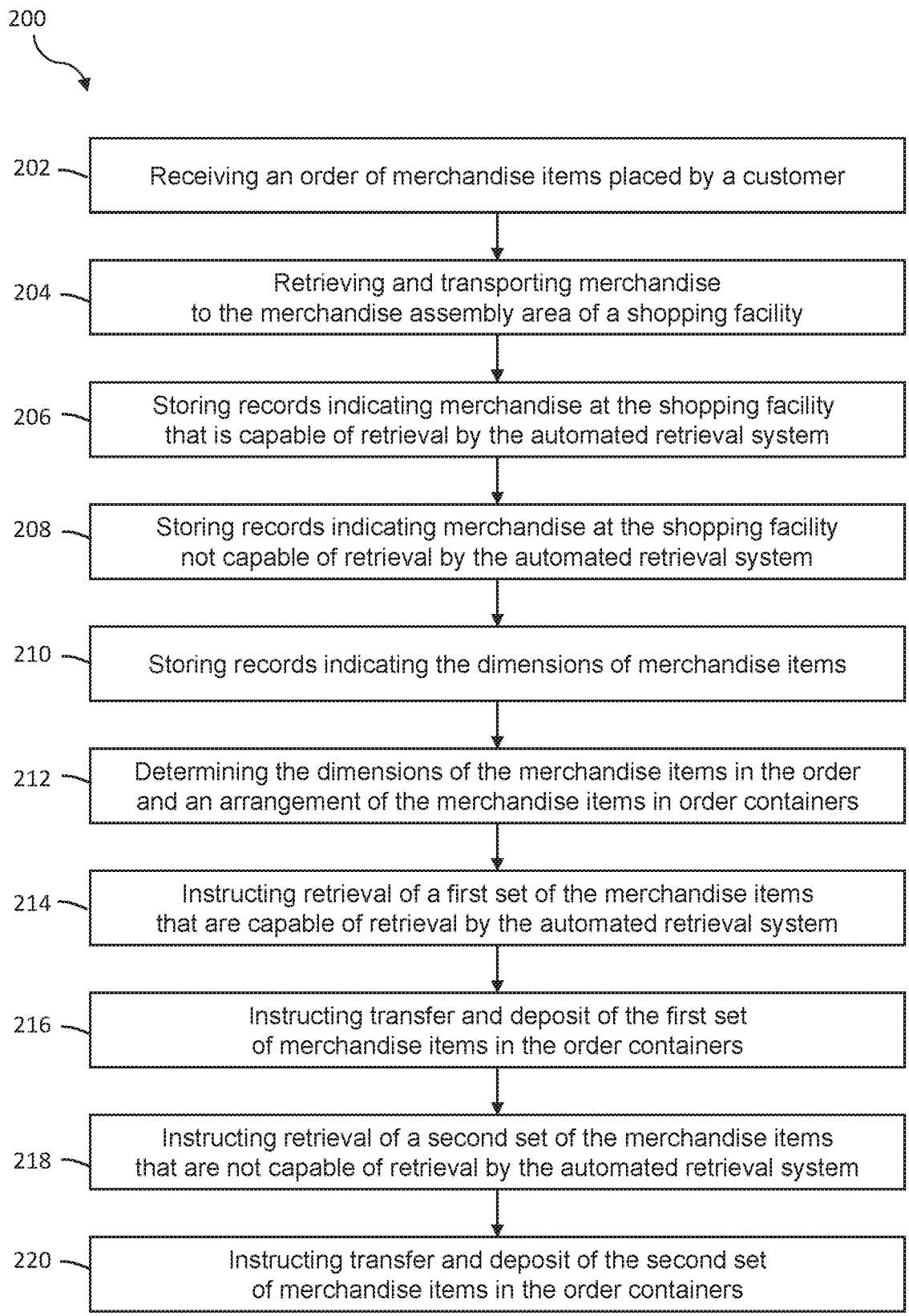
FIG. 5 is a flow diagram in accordance with some embodiments.

Referring to FIG. 5, there is shown a process 200 of assembling merchandise ordered by customers that is subject to multiple retrieval approaches, i.e., subject to dual automated and offline/manual retrieval. In one form, the process 200 may be used to facilitate assembly of an order placed by a customer for presentation to the customer. It is generally contemplated that the process 200 may use some or all of the components described above with respect to system 100.

At block 202, a merchandise order of merchandise items placed by a customer is received. It is generally contemplated that the customer may place this order in various ways, including placing an online order via a computing device or placing an order by phone. Further, it is generally contemplated that the customer seeks to arrange to pick up the merchandise order at a shopping facility (i.e., inside the shopping facility or in the parking lot) or, in some circumstances, to arrange for delivery to a customer-designated location.

At block 204, the ordered merchandise is retrieved and transported to a merchandise assembly area at the shopping facility. In one preferred form, it is contemplated that much of the merchandise will be capable of retrieval by an automated retrieval system at the shopping facility. However, even in this preferred form, there is a likelihood that some merchandise (such as specialty items or out-of-stock items) will not be retrievable by the automated retrieval system.

At blocks 206-10, merchandise records are stored in one or more databases to facilitate retrieval and arrangement of the merchandise items in order containers. It is generally contemplated that these steps may be initiated prior to the receipt of any merchandise orders and may continue during the time period such orders are being received. At block 206, records are stored indicating merchandise at the shopping facility that is capable of retrieval by the automated retrieval system. At block 208, records are stored indicating merchandise at the shopping facility not capable of retrieval by the automated retrieval system. At block 210, records are stored indicating the dimensions of merchandise items. These records may be stored in discrete databases or in a unitary database.

At block 212, the dimensions of the merchandise items in the order are determined, and an arrangement of the merchandise items in order containers is determined. In one form, is preferable to seek to determine the least number of order containers needed to fill the order. The approach is preferably intended to optimize the space in the order containers occupied by merchandise. Without this approach, given the multiple retrieval approaches, there is a likelihood that some of the order containers will only be partially filled, thereby resulting in a wasteful and inefficient use of order containers.

At blocks 214 and 216, merchandise that is capable of being retrieved by the automated retrieval system is retrieved (or online retrieval items). At block 214, retrieval of a first set of the merchandise items that are capable of retrieval by the automated retrieval system is instructed. At block 216, the transfer and deposit of this first set of merchandise items in the order containers is instructed, in accordance with the predetermined arrangement of merchandise items in order containers.

At blocks 218 and 220, merchandise that is not capable of being retrieved by the automated retrieval system is retrieved. At block 218, retrieval of a second set of the merchandise items ("manual" or "offline" items) that are not capable of retrieval by the automated retrieval system is instructed. At block 216, the transfer and deposit of this second set of merchandise items in the order containers is instructed, in accordance with the predetermined arrangement of merchandise items in order containers.

As should be understood, the retrieval of the first and second set of merchandise items can occur in any desired order. For example, the automated retrieval may occur simultaneously with the manual/offline retrieval. Alternatively, all of the automated retrieval items may be retrieved first before any of the manual/offline retrieval items (or vice versa). Depending on the circumstances, it may make sense to have one type of retrieval be performed before the other type of retrieval.

Figure 6:
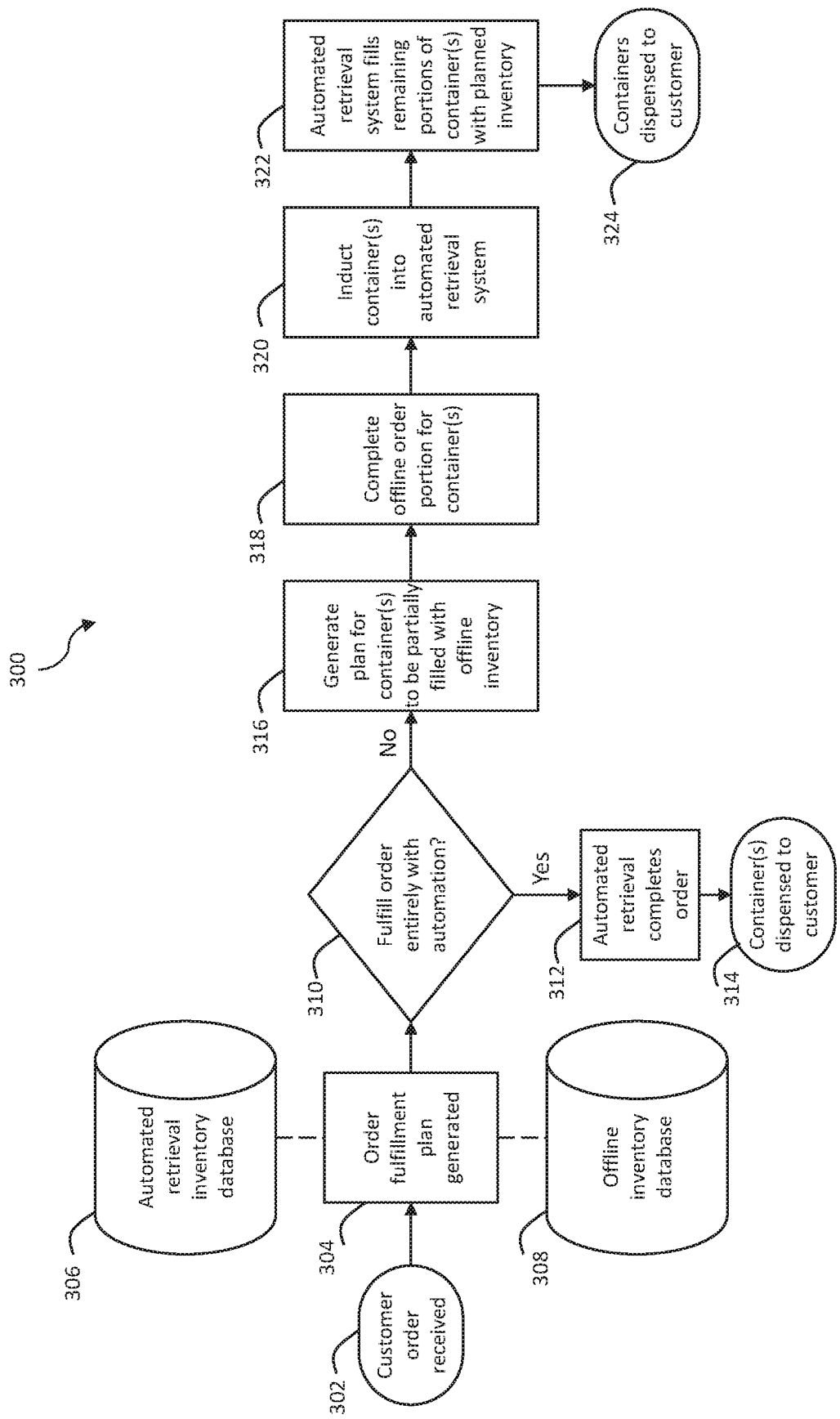
FIG. 6 is a flow diagram in accordance with some embodiments.

Referring to FIG. 6, there is shown a process 300 that is a more specific implementation than process 200. The process 300 seeks to facilitate assembly of a merchandise order that is the subject of automated and manual/offline retrieval and seeks to optimize assembly in order containers. It is generally contemplated that the process 300 may use some or all of the components described above with respect to system 100. As should be understood, the steps of the processes 200 and 300 may be generally performed in any desired order (that is practicable).

At block 302, a customer order is received. As addressed above, the order may be transmitted in various ways (via the customer's computing device or phone) and may be received at a shopping order interface. At block 304, after the order is received, an order fulfillment plan is generated. In other words, a plan is generated for the assignment and arrangement of the merchandise items in the order to order containers. Various assignments and arrangements may be possible, but it is generally contemplated that the fulfillment plan will generally seek to arrange the merchandise efficiently and optimize the use of order containers.

At block 306 and 308, databases are accessed to determine how the merchandise items will be retrieved. Block 306 shows an automated retrieval inventory database to identify items that are capable of automated retrieval. Block 308 shows an offline inventory database to identify items that are not capable of automated retrieval and that instead need to be retrieved offline. The offline inventory database 308 may further identify the locations of such merchandise items, such as specific locations in the shopping facility, nearby stores, distribution centers, supplier warehouses, etc.

At block 310, a determination is made whether the order can be fulfilled entirely by automated retrieval. In one preferred form, it is desirable to ensure that much of the available merchandise is capable of automated retrieval. At block 312, if the order can be fulfilled entirely by automated retrieval, this retrieval is used to complete the order. In other words, automated retrieval may transports all of the merchandise to a merchandise assembly area where it is deposited in the order containers. At block 314, following assembly, the order container(s) may be dispensed to the customer (such as at a designated merchandise pick up area at or about the shopping facility or by delivery to the customer).

At block 316, if the order cannot be fulfilled entirely by automated retrieval, a plan is generated for order containers to be partially filled with offline inventory. In other words, order filling will start with the merchandise items that are subject to offline retrieval (in the offline inventory database) and will then proceed to the merchandise items that are subject to automated retrieval (in the automated retrieval inventory database). At block 318, the order containers are partially filled with all of the offline merchandise items, and the offline portion of the order is completed.

The order filling then proceeds to the remaining merchandise that is the subject of automated retrieval. At block 320, the partially filled order containers are inducted or introduced into the automated retrieval system. At block 322, the automated retrieval system fills the remaining portions of the containers with the planned inventory. At block 324, the order containers have been filled with all of the merchandise in the merchandise order, and the containers are then dispensed to the customer (such as at a designated merchandise pick up area at or about the shopping facility or by delivery to the customer).

As addressed above, much of the assembly of the merchandise order may occur at a store having both automated retrieval and offline retrieval systems. However, it is also contemplated that some of the retrieval may occur at other locations. For example, the automated retrieval may occur first and may be conducted entirely at a shopping facility in the form of a distribution center (or warehouse). Once the automated retrieval has been completed, the partially filled order containers may be transferred to another shopping facility in the form of the store where the customer intends to pick up the order. Once the partially filled order containers arrive at the store, offline retrieval may be performed to fill the order containers with the remaining items in the merchandise order. The customer may then pick up the completed order.

Another aspect of this disclosure addresses large and oversize merchandise items that may be transported in storage containers to the merchandise assembly area as part of the automated retrieval system. Certain merchandise items may be so large that they fill up a storage container almost entirely. In this circumstance, it may be desirable to dispense or present the storage container to the customer, rather than inefficiently transferring a large merchandise item to a new container.

Accordingly, this disclosure addresses generally the use of storage containers/totes (used to store merchandise) and order containers/totes (used for holding and delivery of merchandise ordered by customers). The approach relates to the reassignment of a storage container to an order container without requiring additional handling. As stated above, some items are sufficiently large that only one such item fits within a storage container (bin, tote, etc.), such as, for example, an 18-pack of water. For orders containing these items (a customer's order includes an 18-pack of water), an inefficient approach may be to retrieve the one storage tote with the one 18-pack of water and then present it to the merchandise assembly area, where it is then transferred to another container (an order container). A more efficient approach would be to reassign the storage container as an order container so that no transfer is necessary from the storage container to an order container. Under this approach, there would be no physical difference between the storage tote and the order tote, and the only difference would be in their allocation/assignment in the system. In one form, a merchandise database may be used to determine whether a merchandise item qualifies for a sufficiently large/oversize item such that no transfer is needed.

In another form, there may be a check made of the proportion of space in the storage container occupied by a merchandise item, i.e., a fill rate of the storage container with the item inside. If the item occupies more than a threshold of the volume (e.g. 90%), then this item will qualify for reassignment. If the fill rate of the storage container is below this threshold, and the order contains items smaller than the remaining capacity, then the storage container may be presented at the merchandise assembly area. The storage container is presented in order to be filled closer to 100%, thereby reducing the total container count in the order to the extent possible. For example, if a container holds 2 feet by 3 feet, but the 18-pack of water takes up 1.1 feet by 3 feet, and the order includes smaller items that will fit in the remaining space, then smaller items can be added to the remaining 0.9 feet by 3 feet. As addressed further below, this approach may involve sensors (such as camera arrays and/or scales) to confirm that the fill rate is consistent with the product information received from the merchandise database regarding the products ordered and assigned to that container. This sensor check may be made as confirmation of a size determination based on the merchandise database, or the sensor check may be used to determine merchandise size in lieu of the merchandise database.

Figure 7:
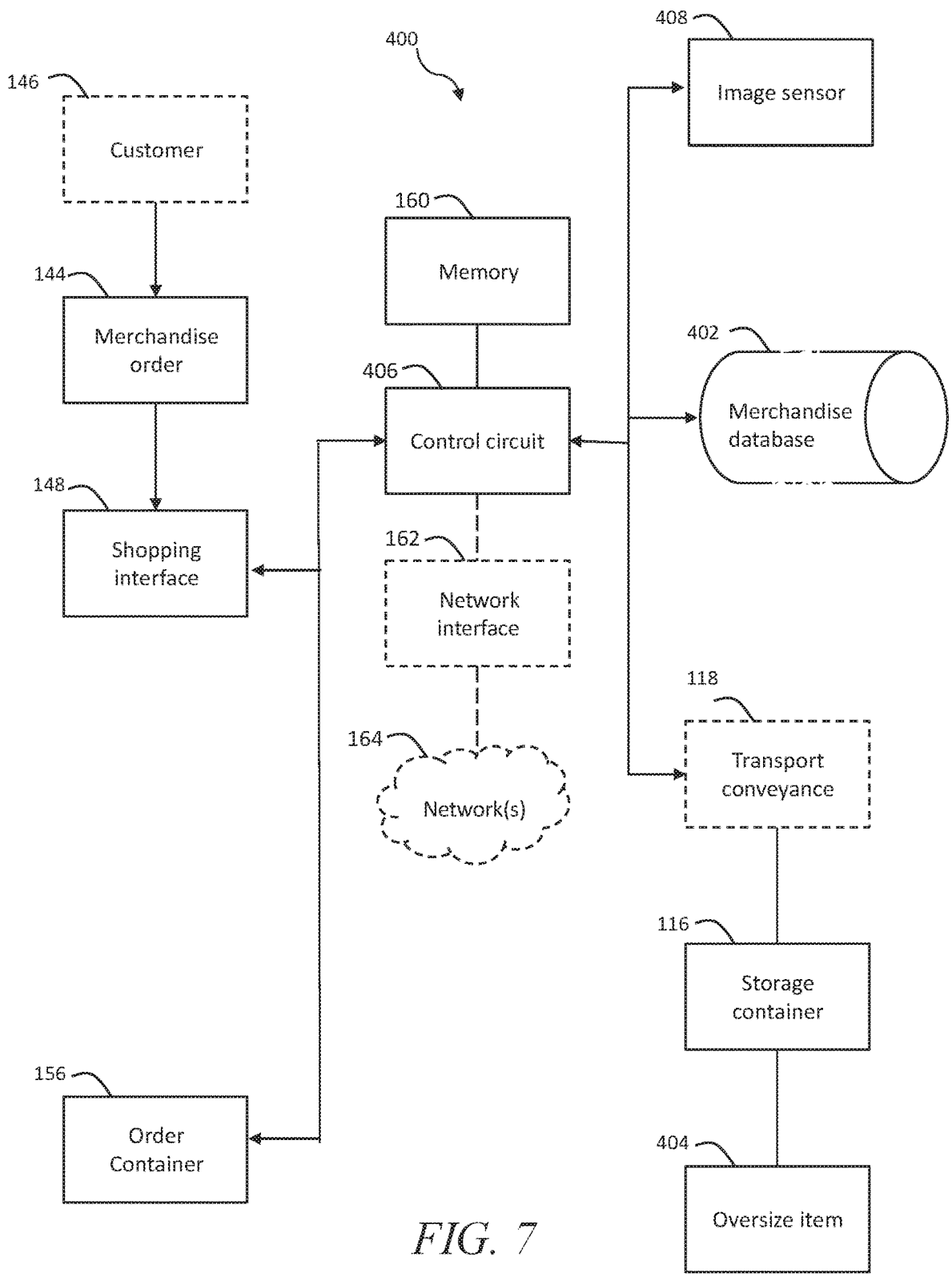
FIG. 7 is a block diagram in accordance with some embodiments.

Referring to FIG. 7, there is shown a system 400 for assembling a merchandise order for a customer where storage containers transported to a merchandise assembly area (or assembly/work station) are used as order containers for large/oversize merchandise items occupying most of the storage container. It is generally contemplated that some of the components of the system 400 are shown in FIGS. 1-4 and were addressed above. As can be seen in FIG. 7, the system 400 includes a shopping order interface 148 configured to receive a merchandise order 144 placed by a customer 146 and including a plurality of merchandise items. The system 400 further includes a shopping facility 102 that includes a merchandise assembly area 106 configured for assembly of part or all of a merchandise order. It also includes an automated retrieval system 104 configured to retrieve and transport merchandise items in a plurality of storage containers 116 to the merchandise assembly area 106.

The system 400, however, may use a different merchandise database or a merchandise database with additional information relative to system 100. More specifically, the system 400 includes a merchandise database 402 containing records of the set of merchandise items with the records indicating the size of each merchandise item and whether each merchandise item of the set exceeds a predetermined threshold size and constitutes an oversize merchandise item 404. As addressed below, this size information is used to determine whether transfer is necessary from a storage container 116 to an order container 156.

The system 400 also includes a control circuit 406 that governs the operation of the system 400. The control circuit 406 may be in wired or wireless communication with the shopping order interface 148 and the merchandise database 402. It is generally contemplated that the control circuit 406 is similar to the description above for control circuit 158, although control circuit 406 is configured to govern and perform different operations. It is further contemplated that memory 160, network interface 162, and network(s) 164 are generally similar to the description above.

The control circuit 406 receives the merchandise order 144 from the shopping order interface 148 and instructs retrieval of the set of the merchandise items in the merchandise order 144 that are capable of retrieval by the automated retrieval system 104. It determines, from the merchandise database 402, a subset of oversize merchandise items 404 being retrieved by the automated retrieval system 104 with each oversize merchandise item 404 occupying one storage container 116. The control circuit 406 then reassigns each storage container 116 transporting an oversize merchandise item 404 as an order container 156. This reassignment may be communicated to the merchandise assembly area 106 (such as by transmitting an identification number corresponding to the storage container 116 or to the oversize merchandise item 404) so that there is no transfer of the oversize item 404 out of the storage container 116. It should also be understood that this reassignment may be performed at various different times. For example, the automated retrieval system 104 need not move a storage container 116 immediately after reassignment from a storage container 116 to an order container 156.

The control circuit 406 determines an assignment of the merchandise items to order containers 156 for the customer 146. In one preferred form, although various assignments and arrangements are possible, it is generally contemplated that the control circuit 406 optimizes the assignment of merchandise to order containers in an efficient manner so as to avoid partially filled order containers 156. In other words, the control circuit 406 selects an assignment to try to avoid the wasteful use of order containers 156. One approach for determining an assignment involves using the dimensions of the merchandise items, comparing them to the dimensions of the order containers 156, and then calculating a collection of merchandise items for each order container 156 that will fit within the order container 156. The merchandise database 402 may contain these dimensions of the merchandise items.

The control circuit 406 then instructs transfer of the merchandise items, excluding the subset of oversize items 404, from the storage containers 116 to the order containers 156. In one form, it is generally contemplated that most of the merchandise items (i.e., the smaller and medium sized items) will be transferred at the merchandise assembly area 106 from storage containers 116 to order containers 156. The oversize items 404, however, are not transferred, and the storage container 116 containing an oversize item 404 will be repurposed as an order container 156.

To facilitate this repurposing, in one form, it is generally contemplated that storage containers 116 and order containers 156 are generally the same. In other words, the storage containers 116 and the order containers 156 have the same size and shape and are generally interchangeable. Each storage container 116 defines a first volume and each order container 156 defines a second volume that is the same as the first volume. In this form, the containers simply perform different purposes: the storage containers 116 are used to transport merchandise to the merchandise assembly area 106, while the order containers 156 are intended for presentation of the completed merchandise order 144 to customers 146.

In one form, it is contemplated that the system 400 may also include an image sensor 408 for capturing images of merchandise in storage containers 116. In other words, the system 400 may include an image sensor 408 configured to capture images of merchandise items being transported in the plurality of storage containers 116 to the merchandise assembly area 106. It is generally contemplated the image sensor 408 may be disposed at the merchandise assembly area 106 or may be disposed at some point along the transport route to the merchandise assembly area 106. The image sensor 408 is preferably oriented so as to capture images of the contents of the storage containers 116 being transported by the automated retrieval system 104.

In one form, the image sensor 408 may be used to confirm that an item designated as a large/oversize item 404, in fact, occupies most of the storage container 116. In other words, the control circuit 406 may confirm, from the images from the image sensor 408, that an oversize merchandise item 404 occupies more than a predetermined volume of a storage container 116 transporting the oversize merchandise item 404 to the merchandise assembly area 106. For example, the predetermined volume threshold may be set at 90% of the storage container 116, and if the merchandise item occupies 90% or more of the storage container, the control circuit 406 may confirm the designation of the item as a large/oversize item 404. On the other hand, if the large/oversize item 404 does not occupy 90% or more of the storage container 116, the item may be undesignated as a large/oversize item 404 in the merchandise database 402.

Also, in one form, images from image sensor 408 may be used to assign merchandise items to order containers 156. In other words, the control circuit 406 may determine the assignment of the non-oversize merchandise items to the order containers 156 for the customer based, at least in part, on the images from the image sensor 408. For example, the control circuit 406 may determine or confirm the number and type of non-oversize merchandise items that need to be arranged in each order container 156. The control circuit 406 may assign two or more non-oversize merchandise items to each order container 156 with the number of non-oversize merchandise items assigned to each order container 156 depending on the total size of the two or more non-oversize items relative to the volume of the order container 156.

As addressed above, the automated retrieval system 104 may take various forms and include various transport devices. For example, the automated retrieval system 104 may include a transport conveyance 118 for transporting the plurality of storage containers 116 to the merchandise assembly area 106, and in form, the transport conveyance may 118 include at least one of a conveyor assembly and an autonomous ground vehicle (AGV) 120. The various components of the AGV 120 were described above. However, other automated retrieval systems 104 and transport conveyances 118 are also contemplated, such as, for example, including a merchandise storage area 114 that is in the form of grid storage accessible to robotic vehicles.

Figure 8:
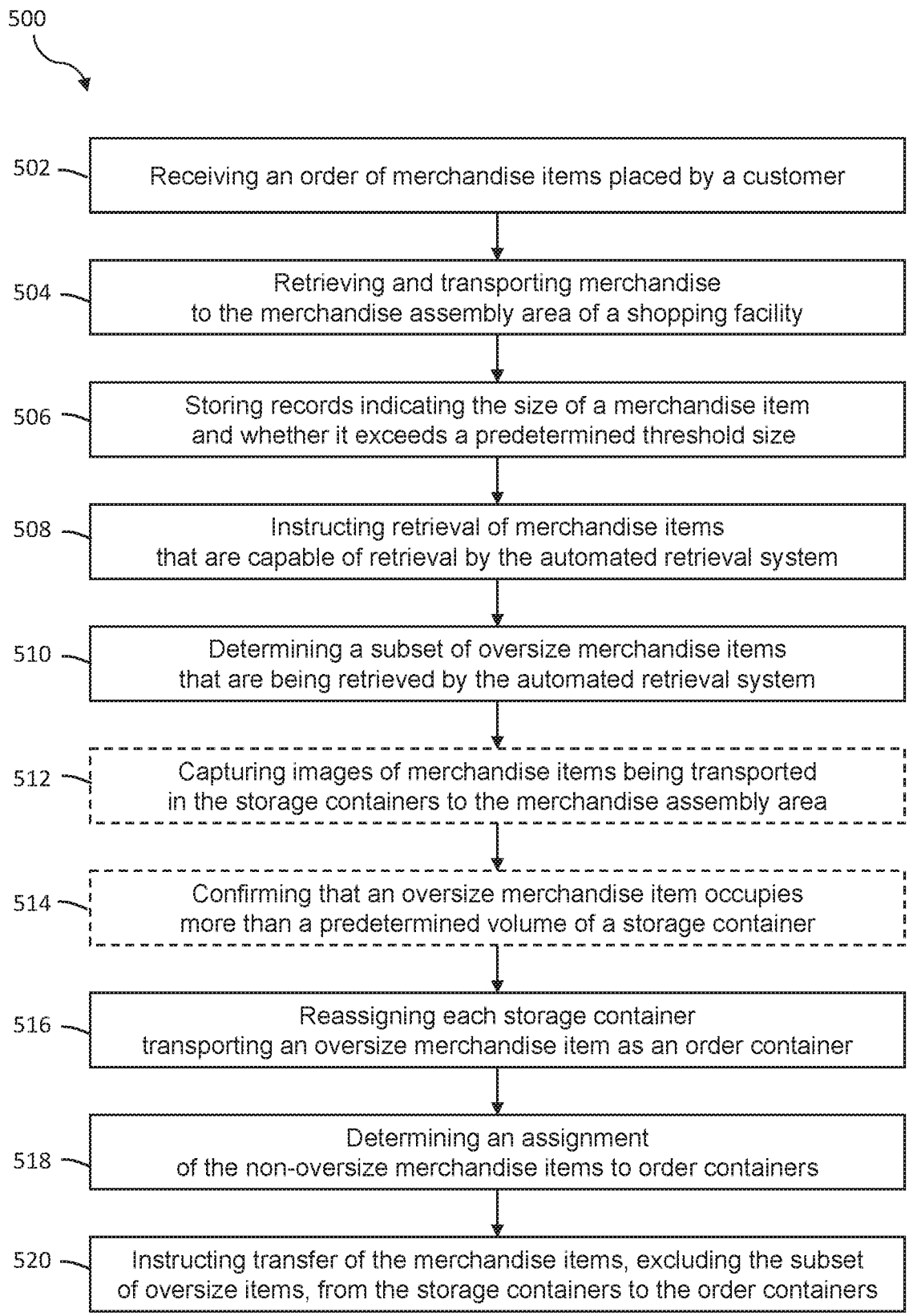
FIG. 8 is a flow diagram in accordance with some embodiments.

Referring to FIG. 8, there is shown a process 500 for assembling a merchandise order for presentation to a customer. In the process 500, storage containers transported to a merchandise assembly area (or assembly/work station) are used as order containers for large/oversize merchandise items occupying most of the storage container. It is generally contemplated that the process 500 may use some or all of the components described above with respect to systems 100 and 400.

At block 502, a merchandise order of merchandise items placed by a customer is received. It is generally contemplated that the customer may place this order in various ways, including placing an online order via a computing device or placing an order by phone. Further, it is generally contemplated that the customer seeks to arrange to pick up the merchandise order at a shopping facility (i.e., inside the shopping facility or in the parking lot) or, in some circumstances, to arrange for delivery to a customer-designated location.

At block 504, the ordered merchandise is retrieved and transported to a merchandise assembly area at the shopping facility. In one preferred form, it is contemplated that much of the merchandise will be capable of retrieval by an automated retrieval system at the shopping facility. However, even in this preferred form, there is a likelihood that some merchandise (such as specialty items or out-of-stock items) will not be retrievable by the automated retrieval system.

At block 506, merchandise records are stored in a merchandise database indicating the size of a merchandise item and whether it exceeds a predetermined threshold size. It is generally contemplated that this step may be initiated prior to the receipt of any merchandise orders and may continue during the time period such orders are being received. In some forms, the merchandise database may include specific dimensions of the merchandise items, which may facilitate the assignment and arrangement of the merchandise items in order containers.

At block 508, retrieval of merchandise items that are capable of retrieval by the automated retrieval system is instructed. The merchandise items are transported to the merchandise assembly area. At block 510, a subset of oversize merchandise items that are being retrieved by the automated retrieval system is determined. In this form, it is contemplated that the merchandise database is accessed to determine these oversize items.

Optionally, at block 512, images are captured of merchandise items being transported in the storage containers to the merchandise assembly area. It is generally contemplated that an image sensor is disposed at the merchandise assembly area (or along the transport route to the merchandise assembly area) and is oriented to see the interior of the storage containers. Optionally, at block 514, it is confirmed that an oversize merchandise item occupies more than a predetermined volume of a storage container. If the oversize merchandise item does not occupy more than the predetermined volume, the item is re-designated as not being an oversize merchandise item.

At blocks 510-20, the merchandise items are then transferred to order containers (or not transferred if the item is an oversize item). At block 516, each storage container transporting an oversize merchandise item is reassigned as an order container. As addressed above, this reassignment may be performed at various different times, and the automated retrieval system need not move the storage container immediately following reassignment. At block 518, an assignment of the non-oversize merchandise items to order containers is determined. In one preferred form, the assignment of merchandise to order containers is optimized in an efficient manner so as to avoid partially filled order containers. At block 520, transfer of the merchandise items is instructed, excluding the subset of oversize items, from the storage containers to the order containers.

Figure 9:
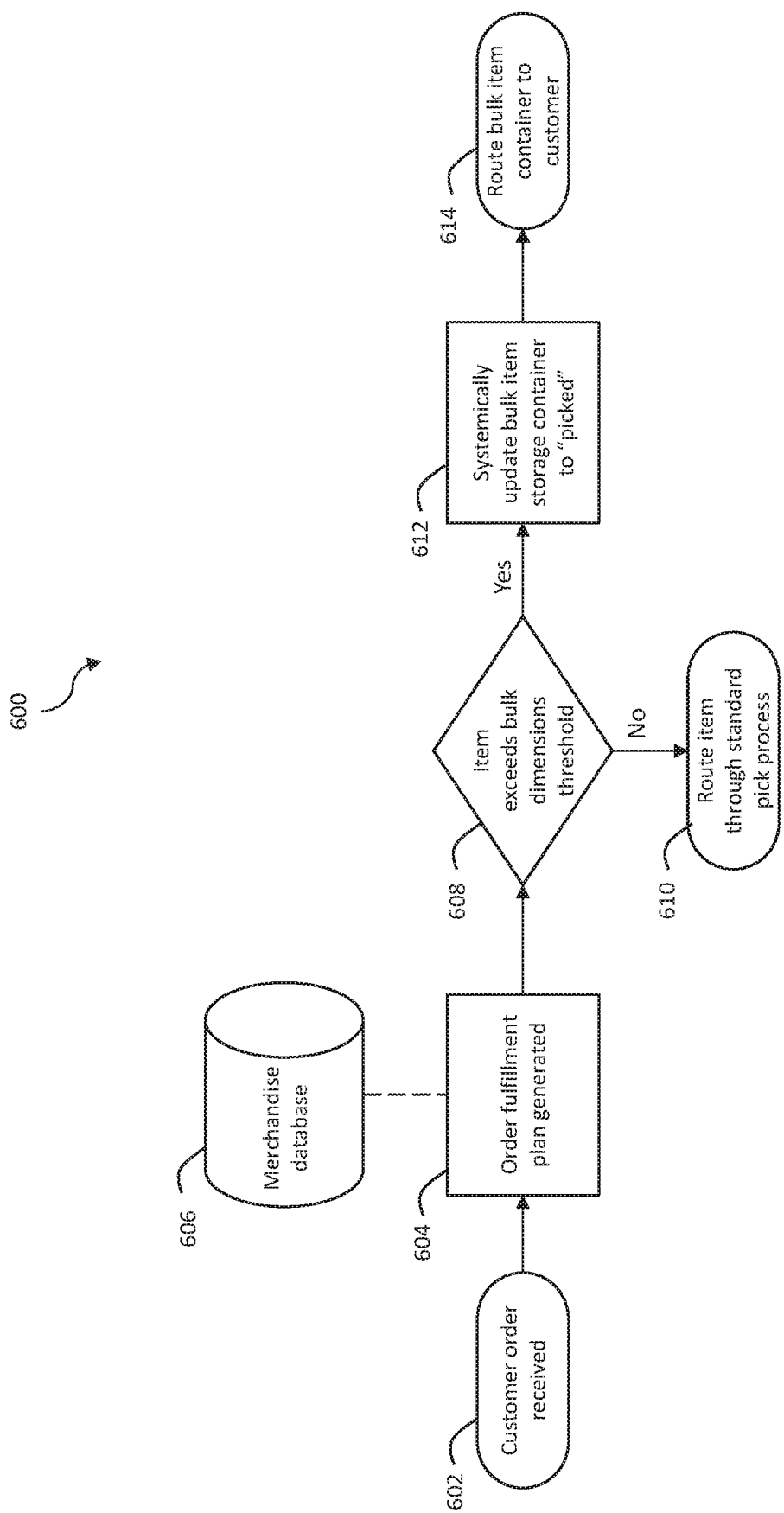
FIG. 9 is a flow diagram in accordance with some embodiments.

Referring to FIG. 9, there is shown a process 600 that is a more specific or alternative implementation to process 500. The process 300 seeks to facilitate assembling a merchandise order for a customer where storage containers transported to a merchandise assembly area are used as order containers for large/oversize merchandise items. It is generally contemplated that the process 600 may use some or all of the components described above with respect to systems 100 and 400. As should be understood, the steps of the processes 500 and 600 may be generally performed in any desired order (that is practicable).

At block 602, a customer order is received. As addressed above, the order may be transmitted in various ways (via the customer's computing device or phone) and may be received at a shopping order interface. At block 604, after the order is received, an order fulfillment plan is generated. In other words, a plan is generated for the assignment and arrangement of the merchandise items in the order to order containers. Various assignments and arrangements may be possible, but it is generally contemplated that the fulfillment plan will generally seek to arrange the merchandise efficiently and optimize the use of order containers.

At block 606, a merchandise database is accessed. The merchandise database may include a field for each merchandise item indicating whether the item is considered a large/oversize item. The merchandise database may also include dimensional information about each merchandise item to facilitate calculation of the arrangement of multiple merchandise items in the order containers.

At block 608, a determination is made as to whether each merchandise item exceeds a bulk dimensions threshold. At block 610, if the item does not exceed the threshold, it will be routed through the standard pick process. In other words, it will be routed to the merchandise assembly area and will be transferred from its storage container to an order container, pursuant to the order fulfillment plan.

At block 612, if the item does exceed the threshold, the bulk item storage container holding the oversize item will be updated to a picked status (i.e., the storage container will be reassigned as an order container). In other words, the status will be updated so as to indicate that no transfer action needs to be taken. The bulk item storage container will arrive at the merchandise assembly area and will then be made available to the customer (as part of the overall, completed merchandise order presented to the customer). At block 614, the bulk item container is routed to the customer (i.e., presented to the customer at the shopping facility (inside or in the parking lot) or, in some circumstances, delivered to the customer).

In the above system 400 and processes 500 and 600, it is generally contemplated that a merchandise database is used to track the large/oversize status of a merchandise item (which status may be updated). Further, in some forms, an image sensor may be used to capture images of merchandise items and their occupancy of storage containers to confirm (or update) the large/oversize status of merchandise items. However, it is also contemplated that the image sensor may be used alone to make the determination of a merchandise item's large/oversize status. In other words, a merchandise database need not be used (or may serve a backup, confirmatory role), and the image sensor itself serves as the lone or primary determinant of the large/oversize status of merchandise items. In this form, the image sensor captures images of merchandise items being transported in storage containers to the merchandise assembly area, and a control circuit determines, from the images from the image sensor, that a merchandise item constitutes an oversize merchandise item when it occupies more than a predetermined volume of a storage container transporting that item to the merchandise assembly area. In other words, the size of the items may be determined by the image sensors (not a merchandise database) where the images show the degree of occupancy of a merchandise item in a storage container.

Those skilled in the art will recognize that a wide variety of other modifications, alterations, and combinations can also be made with respect to the above described embodiments without departing from the scope of the invention, and that such modifications, alterations, and combinations are to be viewed as being within the ambit of the inventive concept.

What is claimed is:

1. A system for assembling merchandise ordered by customers and subject to multiple types of retrieval, the system comprising:
    a shopping order interface configured to receive a merchandise order placed by a customer and including a plurality of merchandise items;
    a shopping facility comprising a merchandise pickup area configured for pickup of the merchandise order and a merchandise assembly area;
    an automated retrieval system configured to retrieve and transport merchandise to the merchandise assembly area;
    an automated retrieval inventory database containing a plurality of records of merchandise at the shopping facility, each record of the plurality of records indicating that a corresponding merchandise item is capable of retrieval by the automated retrieval system;
    an offline retrieval inventory database containing a plurality of records of merchandise at the shopping facility, each record of the plurality of records indicating that a corresponding merchandise item is not capable of retrieval by the automated retrieval system;
    a control circuit communicatively coupled to the shopping order interface, the automated retrieval inventory database, and the offline retrieval inventory database, the control circuit configured to:
        receive the merchandise order from the shopping order interface;
        determine a first set of merchandise items from the automated retrieval inventory database indicated as being retrievable by the automated retrieval system and determine a second set of merchandise items from the offline retrieval inventory database that are indicated as not being retrievable by the automated retrieval system;
        instruct retrieval of the first set of merchandise items in the merchandise order that are in the automated retrieval inventory database and capable of retrieval by the automated retrieval system;
        instruct transfer and deposit of the first set of merchandise items into one or more order containers;
        instruct retrieval of the second set of merchandise items in the merchandise order that are in the offline retrieval inventory database and not capable of retrieval by the automated retrieval system; and
        instruct transfer and deposit of the second set of merchandise items into the one or more order containers.

2. The system of claim 1, wherein:
    the shopping facility further comprises a merchandise storage area configured to store merchandise;
    the automated retrieval system further comprises:
        a plurality of storage containers configured to contain merchandise in the merchandise storage area; and
        a transport conveyance configured to transport storage containers between the merchandise storage area and the merchandise assembly area.

3. The system of claim 2, wherein the transport conveyance comprises at least one of a conveyor assembly, a robotic arm, a robotic vehicle, or a robotic bot.

4. The system of claim 3, wherein the robotic vehicle is an autonomous ground vehicle.

5. The system of claim 1, wherein the control circuit is further configured to:
    determine if all of the plurality of merchandise items in the merchandise order are in the automated retrieval inventory database, and
    allocate the first set to include all of the plurality of merchandise items in the merchandise order and allocate the second set to not include any of the plurality of merchandise items.

6. The system of claim 1, wherein the control circuit is further configured to:
    determine completion of transfer and deposit of the first and second sets of merchandise items into the one or more order containers.

7. The system of claim 1, wherein:
    the offline retrieval inventory database further contains a plurality of records of merchandise that is not available at the shopping facility but that is available at other shopping facilities; and
    the control circuit is configured to instruct retrieval of a subset of the second set of merchandise items that are not available at the shopping facility but that are available at other shopping facilities.

8. The system of claim 1, wherein the control circuit is configured to instruct that transfer and deposit of the first set of merchandise items from the automated retrieval inventory database be performed prior to transfer and deposit of the second set of merchandise items from the offline retrieval inventory database.

9. The system of claim 1, wherein the automated retrieval inventory database and the offline retrieval inventory database are part of a single database.

10. The system of claim 1, wherein the merchandise pickup area and the merchandise assembly area are in a same physical area of the shopping facility.

11. The system of claim 1, wherein the control circuit is further configured to:
    determine dimensions of the plurality of merchandise items in the merchandise order; and
    determine an arrangement of the plurality of merchandise items combining the first set and second set in one or more order containers.

12. A method of assembling merchandise ordered by customers and subject to multiple types of retrieval, the method comprising:
    by a shopping order interface, receiving a merchandise order placed by a customer and including a plurality of merchandise items;
    providing a shopping facility comprising a merchandise pickup area configured for pickup of the merchandise order and a merchandise assembly area;
    by an automated retrieval system, retrieving and transporting merchandise to the merchandise assembly area;
    storing in an automated retrieval inventory database a plurality of records of merchandise at the shopping facility, each record of the plurality of records indicating that a corresponding merchandise item is capable of retrieval by the automated retrieval system;

storing in an offline retrieval inventory database a plurality of records of merchandise at the shopping facility, each record of the plurality of records indicating that a corresponding merchandise item is not capable of retrieval by the automated retrieval system;

by a control circuit:
- receiving the merchandise order from the shopping order interface;
- determining a first set of merchandise items from the automated retrieval inventory database indicated as being retrievable by the automated retrieval system and determining a second set of merchandise items from the offline retrieval inventory database that are indicated as not being retrievable by the automated retrieval system;
- instructing retrieval of the first set of merchandise items in the merchandise order that are in the automated retrieval inventory database and capable of retrieval by the automated retrieval system;
- instructing transfer and deposit of the first set of merchandise items into one or more order containers;
- instructing retrieval of the second set of merchandise items in the merchandise order that are in the offline retrieval inventory database and not capable of retrieval by the automated retrieval system; and
- instructing transfer and deposit of the second set of merchandise items into the one or more order containers.

13. The method of claim 12, wherein:
the shopping facility further comprises a merchandise storage area configured to store merchandise;
the automated retrieval system further comprises:
- a plurality of storage containers configured to contain merchandise in the merchandise storage area; and
- a transport conveyance configured to transport storage containers between the merchandise storage area and the merchandise assembly area.

14. The method of claim 13, wherein the transport conveyance comprises at least one of a conveyor assembly, a robotic arm, a robotic vehicle, or a robotic bot.

15. The method of claim 14, wherein the robotic vehicle is an autonomous ground vehicle.

16. The method of claim 12, further comprising, by the control circuit:
- determining if all of the plurality of merchandise items in the merchandise order are in the automated retrieval inventory database, and
- allocating the first set to include all of the plurality of merchandise items in the merchandise order and allocating the second set to not include any of the plurality of merchandise items.

17. The method of claim 12, further comprising, by the control circuit:
- determining completion of transfer and deposit of the first and second sets of merchandise items into the one or more order containers.

18. The method of claim 12, further comprising:
- storing in the offline retrieval inventory database a plurality of records of merchandise that is not available at the shopping facility but that is available at other shopping facilities; and
- by the control circuit, instructing retrieval of a subset of the second set of merchandise items that are not available at the shopping facility but that are available at other shopping facilities.

19. The method of claim 12, wherein instructing transfer and deposit of the first set of merchandise items from the automated retrieval inventory database is performed prior to instructing transfer and deposit of the second set of merchandise items from the offline retrieval inventory database.

20. The method of claim 12, wherein the automated retrieval inventory database and the offline retrieval inventory database are part of a single database.

21. The method of claim 12, wherein the merchandise pickup area and the merchandise assembly area are in a same physical area of the shopping facility.

22. The method of claim 12, further comprising, by the control circuit:
- determining dimensions of the plurality of merchandise items in the merchandise order; and
- determining an arrangement of the plurality of merchandise items combining the first set and second set in one or more order containers.

* * * * *